Jan. 15, 1957 W. R. SUTTON 2,777,271
GRASS BLOWER ATTACHMENTS FOR LAWN MOWERS
Filed May 3, 1955 2 Sheets-Sheet 1

William R. Sutton
INVENTOR.

BY *Clarence A. O'Brien*
*and Harvey B. Jacobson*
Attorneys

Jan. 15, 1957  W. R. SUTTON  2,777,271
GRASS BLOWER ATTACHMENTS FOR LAWN MOWERS
Filed May 3, 1955  2 Sheets-Sheet 2
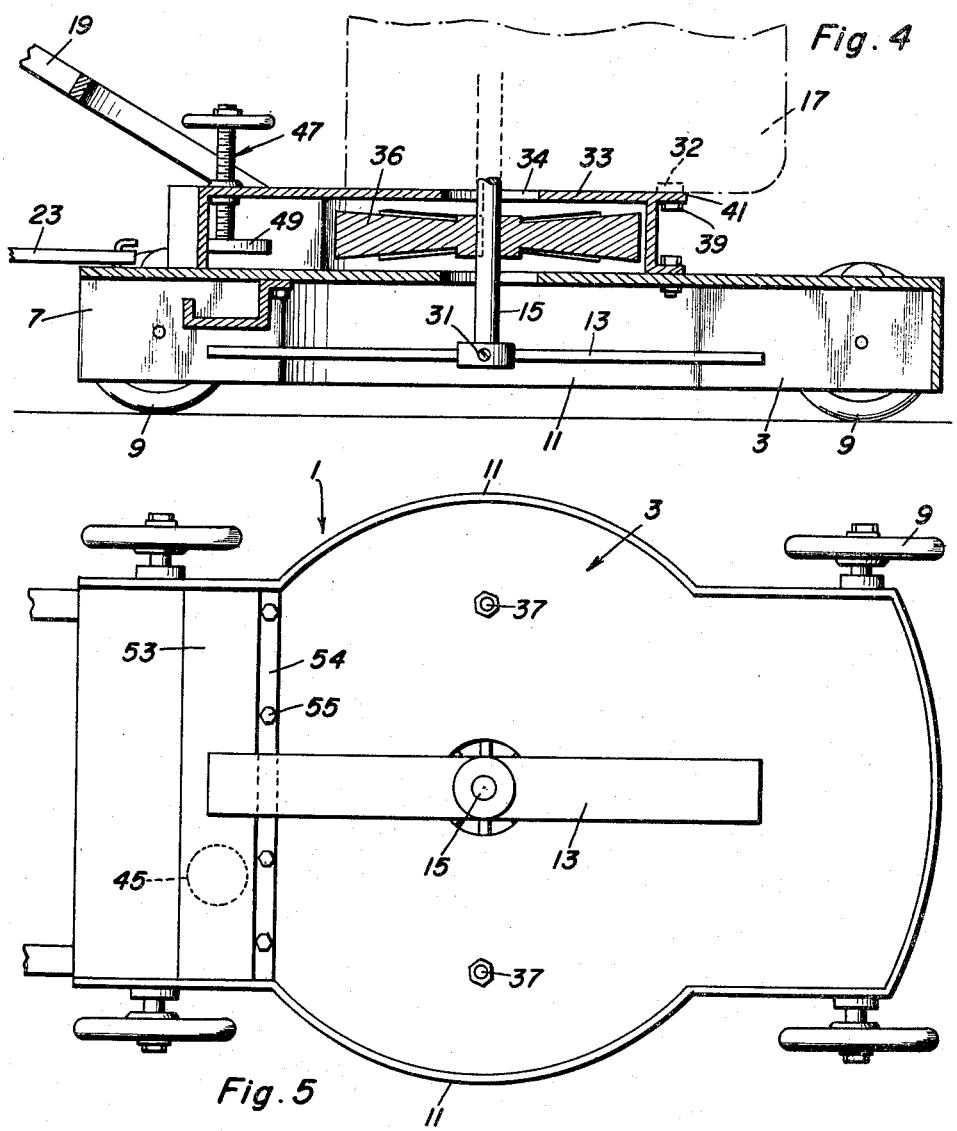
William R. Sutton
INVENTOR.

United States Patent Office 2,777,271
Patented Jan. 15, 1957

2,777,271

GRASS BLOWER ATTACHMENTS FOR LAWN MOWERS

William R. Sutton, Odessa, Tex., assignor, by direct and mesne assignments, to The Huffman Company, Odessa, Tex., a partnership consisting of T. W. Huffman, Sr., and T. W. Huffman, Jr.

Application May 3, 1955, Serial No. 505,615

1 Claim. (Cl. 56—25.4)

My invention relates to improvements in grass blower attachments for lawn mowers of the type in which a motor on a flat frame drives a horizontally rotating cutter.

The primary object of my invention is to provide an easily installed attachment for such lawn mowers for blowing grass as it is cut into a grass catcher basket carried on the rear end of the frame.

Another object is to provide an attachment for the above purpose which will blow the cut grass into the basket from under the frame and incidentally clean the lawn of dead grass, leaves and insects and blow the same into the basket.

Still another object is to provide an attachment having the above advantages and which utilizes the motor of the lawn mower to directly operate a blower fan.

Yet another object is to provide such an attachment which is adapted to be installed without altering the basic structure of the lawn mower, is simple in construction, will not clog, is adapted for manufacture at a comparatively low cost, and will not appreciably add to the weight of the lawn mower.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a view in vertical longitudinal section taken on the line 4—4 of Figure 2; and Figure 5 is an enlarged view in bottom plan partly broken away.

Figure 1:
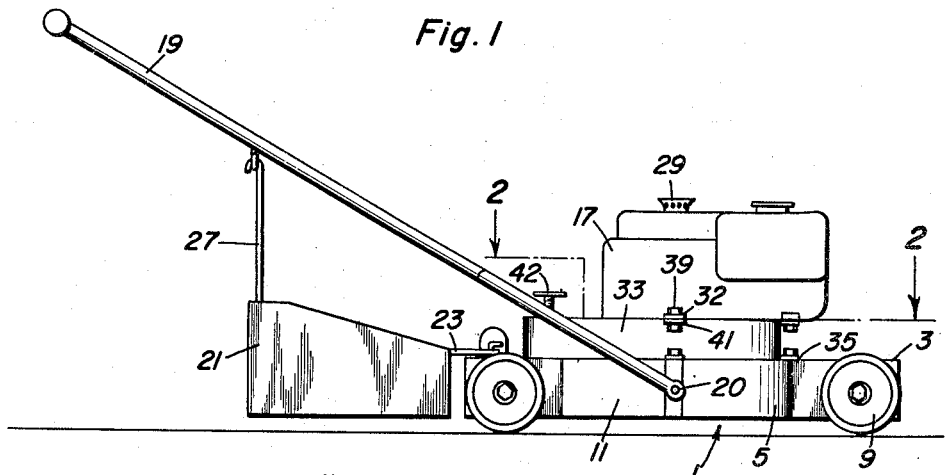
Figure 1 is a view in side elevation of a lawn mower of the type indicated having my blower attachment installed thereon.
Figure 2:
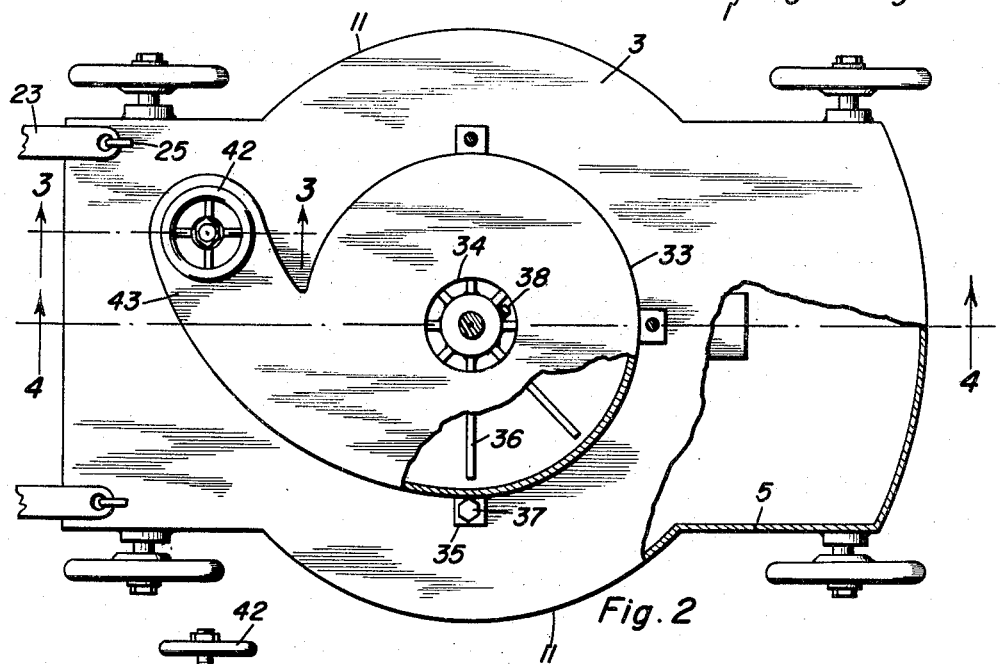
Figure 2 is an enlarged view in plan of the same partly broken away and shown in section.
Figure 3:
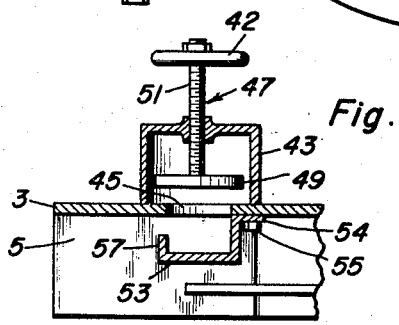
Figure 3 is a fragmentary view in vertical section taken on the line 3—3 of Figure 2.

Referring to the drawings by numerals, 1 designates a lawn mower of a type for which my blower attachment is especially designed and which being well known has been illustrated generally as sufficient for the present purposes and need merely be briefly described.

The lawn mower 1 comprises a flat top elongated frame 3 with a depending skirt flange 5 at its front and sides, the rear end 7 being open. Ground wheels 9 support the frame 3 at its corners. The flange 5 at the sides of the frame bulge outwardly to provide arcuate side portions 11 to accommodate the rotary bladed cutter 13 which is suspended on the lower end of a power shaft 15 driven by a motor 17 which is usually bolted on top of the frame. A handle 19 inclines upwardly and rearwardly from the side portions 11, and is pivoted thereto, as at 20.

A grass catcher basket 21 is suspended at its front end from the rear end 7 of the frame 3 as by apertured side bars 23 on the basket engaging over hooks 25 on the frame 3, said basket being suspended at its rear end from the handle by the hanger means, as at 27. The power shaft 15 is vertically adjustable relative to the motor 17 by means of an adjusting nut 29 and the cutter 13 is vertically adjustable by means of a setscrew 31 therein and is also detachable from said shaft.

The attachment of my invention comprises a substantially circular open bottom fan housing 33 with lateral apertured base lugs 35 thereon by means of which and bolts 37 said housing 33 is attached on top of the frame 3 concentrically of the power shaft 15 to support the motor 17 which is detachably attached on top of said housing 33 by the usual apertured bottom lugs 32 thereon and bolts 39 extending through said lugs 32 and through similar lateral lugs 41 on said housing 33 adjacent the top of said housing. The power shaft 15 extends through a central opening 34 in the top of the housing 33 with a fan 36 fixed thereon in said housing by a setscrew 38.

The housing 33 is formed with a substantially tangential open bottom air discharge neck 43 seating on top of the frame 3 and registering at its outer end with a circular air discharge opening 45 provided in the top of the frame 3 adjacent one side of said frame.

A valve 47 is provided in the outer end of said neck for controlling the passage of air downwardly through the opening 45. The valve comprises a valve disk 49 in said neck 43 above and vertically aligned with the opening 45 and which is fixed on the lower end of a vertical valve stem 51 extending upwardly out of the neck 43 and threaded through the top of said neck with a hand wheel 42 on the upper end of said stem.

A channel bar 53 extends transversely beneath the top of the frame 3 from side to side of the frame with a longitudinal front edge flange 54 bolted, as at 55, to the top of the frame 3 and an upturned rear edge flange 57 spaced from the top of the frame for escape of air out of said bar rearwardly. The channel bar 53 is vertically aligned with the opening 45 with one end directly below said opening and forms an air pocketing baffle and distributing member which pockets air blown through the opening 45 and discharges the same rearwardly through the space between the top of the frame 3 and the flange 57 in a column as wide substantially as the rear end 7 of the frame 3.

The operation of my invention will be readily understood. The fan 36 is driven by the power shaft 15 at the same speed as the cutter 13 and blows air through the neck 43 and opening downwardly into one end of the channel bar 53 which pockets and collects the air and deflects the same rearwardly in a column in a manner which will be clear to discharge out of the rear end 7 of the frame 3. The air thus discharged out of the bar blows grass as it is cut into the basket 21 and creates sufficient suction in the rear end portion of the frame 3 at the ground level to pick up cut grass, insects and the like off the lawn to be blown into the basket 21. By adjusting the valve 47, the velocity of the column of discharged air may be varied as desired or the blower rendered ineffective.

As will be seen, the housing 33, fan 36 and bar 53 form an attachment which may be readily installed on the type of lawn mower described to form the blower, the only alteration required in the lawn mower being the opening 45, it being merely necessary to raise the motor 17, and provide the opening.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

In a lawn mower having a flat top provided with depending side flanges forming the said top and open bottom rear discharge end for cut glass, a fan housing on said top, a motor supported on said fan housing and having a power shaft depending through said fan housing and top and having fixed thereon a blower fan in said fan housing and a horizontal cutter blade below said top, and means for distributing air from said fan housing rearwardly through the upper portion of said discharge end to blow cut grass out of said discharge end and create suction in said upper portion to lift cut grass from the ground comprising an upwardly opening transverse air distributing channel bar in the upper portion of said discharge end fitting endwise between the side flanges and having a front edge fixed to said top and a rear edge spaced below said top for the escape of air out of said bar, and an air discharge neck on said fan housing communicating through said top with one end portion of said bar.

References Cited in the file of this patent

UNITED STATES PATENTS

| | | |
|---|---|---|
| 1,614,386 | Peebles et al. | Jan. 11, 1927 |
| 2,491,544 | Arkenberg | Dec. 20, 1949 |